United States Patent
Okamoto et al.

(10) Patent No.: US 7,560,877 B2
(45) Date of Patent: Jul. 14, 2009

(54) OPERATION CIRCUIT FOR A DISCHARGE LAMP AND DEVICE FOR OPERATION OF A DISCHARGE LAMP AND A LIGHT SOURCE DEVICE

(75) Inventors: Masashi Okamoto, Himeji (JP); Kensuke Fukushima, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 564 days.

(21) Appl. No.: 11/419,092

(22) Filed: May 18, 2006

(65) Prior Publication Data
US 2006/0267512 A1 Nov. 30, 2006

(30) Foreign Application Priority Data
May 30, 2005 (JP) .............................. 2005-156539

(51) Int. Cl.
*G05F 1/00* (2006.01)
(52) U.S. Cl. ....................... 315/307; 315/291; 315/308; 315/224
(58) Field of Classification Search ............. 315/209 R, 315/224–226, 246, 274, 276, 291, 307, 308, 315/325, 330, DIG. 5, DIG. 7
See application file for complete search history.

(56) References Cited
U.S. PATENT DOCUMENTS
4,673,843 A 6/1987 Okanuma
5,481,163 A * 1/1996 Nakamura et al. .......... 315/308
6,476,568 B2 * 11/2002 Urakabe et al. ............. 315/307
6,552,502 B2 * 4/2003 Okamoto et al. ............ 315/336
6,661,184 B2 12/2003 Okamoto et al.
6,734,643 B2 5/2004 Okamoto et al.
7,012,381 B2 * 3/2006 Samejima et al. ........... 315/219

* cited by examiner

*Primary Examiner*—Douglas W Owens
*Assistant Examiner*—Jimmy T Vu
(74) *Attorney, Agent, or Firm*—David S. Safran; Roberts Mlotkowski Safran & Cole, P.C.

(57) ABSTRACT

An operating circuit for a discharge lamp having an external auxiliary electrode and main discharge electrodes in a discharge space, in which the disadvantage of lamp damage due to detachment of glass material, such as silica glass or the like, of a hermetically sealed portion of the discharge vessel from the electrode material in alternating current operation of a discharge lamp is prevented by a feed circuit having an inverter, and a trigger circuit for supply of a pulsed current to the primary winding of a high voltage transformer with an autotransformer arrangement for applying a high voltage to the auxiliary electrode in which the electrical potential of the trigger terminals is maintained essentially at the same electrical potential as the output line on the low voltage side of the feed circuit when the trigger circuit is inoperative.

18 Claims, 4 Drawing Sheets

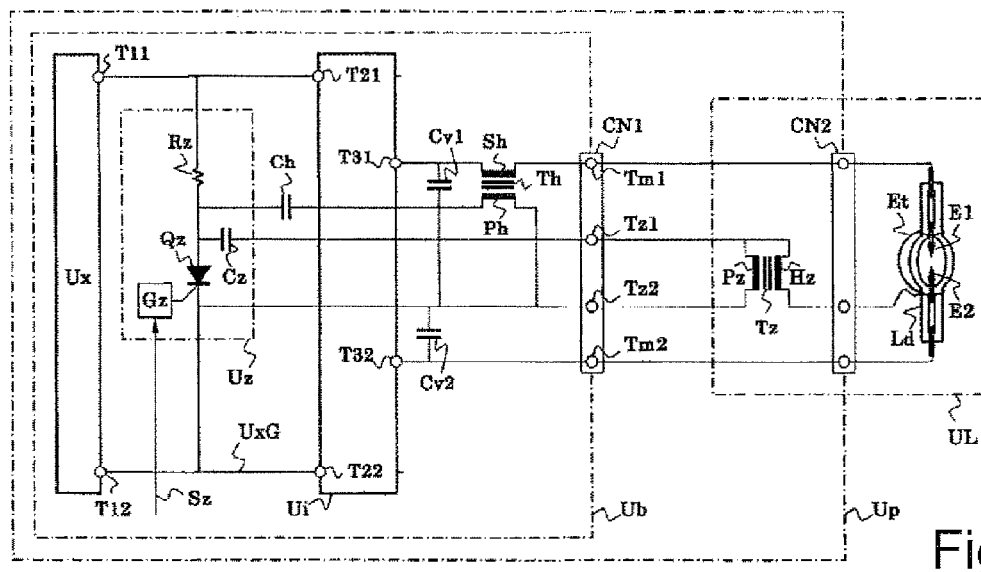
Fig. 5
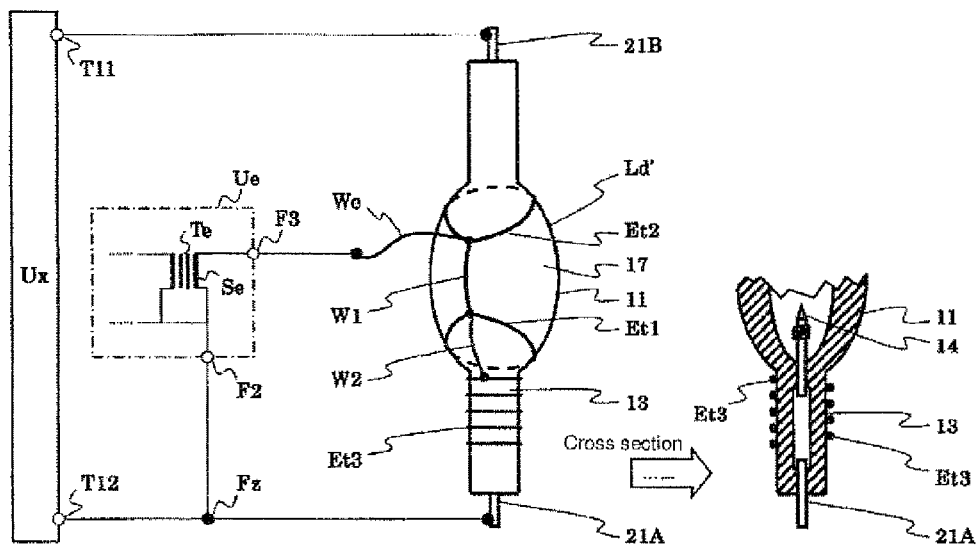
Fig. 6 (a) (Prior Art)   Fig. 6 (b) (Prior Art)

OPERATION CIRCUIT FOR A DISCHARGE LAMP AND DEVICE FOR OPERATION OF A DISCHARGE LAMP AND A LIGHT SOURCE DEVICE

BACKGROUND OF THE INVENTION

1. Field of the Invention

The invention relates to an operation circuit for a discharge lamp which is used to operate a discharge lamp, especially a high radiance discharge lamp, such as a high pressure mercury lamp, a metal halide lamp, a xenon lamp or the like. The invention furthermore relates to a device for operating a discharge lamp using this operation circuit for a discharge lamp and a light source device using this device for operating a discharge lamp.

2. Description of the Prior Art

In a light source device for an optical device for display of images or for similar purposes, such as for example a liquid crystal projector or a DLP™ projector, a high radiance discharge lamp (HID lamp) is used. Of a light source device for such an optical device, there is a demand for prolonging the service life of the lamp and for reducing the size of the device for operating the discharge lamp.

In the case of operation of such a lamp, in the state in which a voltage which is called the no-load voltage is applied to the lamp, a high voltage is applied and thus in the discharge space an insulation breakdown is produced, and a transition after the glow discharge into an arc discharge takes place. As a process for applying a high voltage to the lamp, besides the process of superimposing a high voltage on the electrodes for the main discharge using an ignitor, i.e. besides the series trigger method, there is a process of an outside trigger method in which there is an auxiliary electrode in addition to the electrodes for the main discharge without contact with the discharge space and a high voltage is applied to this auxiliary electrode.

The outside trigger method has various advantages which the series triggering method does not, such as is described for example in Japanese patent disclosure document 2002-270386 corresponds to U.S. Pat. No. 6,552,502 or in Japanese patent disclosure document 2003-017283 corresponds to U.S. Pat. No. 6,734,643. In particular, in the case in which a high voltage generation part which comprises a high voltage transformer is separated from the feed switching part and is located in the vicinity of the discharge lamp (Ld), these advantages can be fully exploited. These advantages are: a reduction in the size and weight of the device for operating the discharge lamp, reduction of noise, increased reliability, cost reduction and the like.

The outside trigger method can be used in the same way both for a direct current operation type in which a DC voltage is applied to the two poles for the main discharge and operation is carried out, and also for an alternating current operation type in which an AC voltage is applied and the lamp is operated. The exemplary embodiments for this purpose are described in the above described Japanese patent disclosure documents 2002-270386 corresponds to U.S. Pat. No. 6,552,502, 2003-017283 corresponds to U.S. Pat. No. 6,734,643, and in Japanese patent disclosure document 2003-092198 corresponds to U.S. Pat. No. 6,661,184.

In particular, in the above described Japanese patent disclosure document 2002-270386 corresponds to U.S. Pat. No. 6,552,502 for a light source device of the direct current operation type, an outer lead pin (21A) on the cathode side of a discharge lamp (Ld') in FIGS. 6(a) and (b) (FIGS. 6(a) and (b) are essentially identical to FIG. 9 in Japanese patent disclosure document 2002-270386 (U.S. Pat. No. 6,552,502)) is connected to the terminal (F2) of the ground of a starter (Ue) and to the terminal (T12) of the ground output of a feed circuit (Bx). Furthermore, an outer lead pin (21B) is connected on the anode side to a terminal (T11) of the plus output of the feed circuit (Bx), while an auxiliary electrode (Et) which consists of conductors (Et1, Et2, Et3) and conductive wires (W1, W2, We) is connected via the conductive wire (We) to one terminal (F3) of the output of the starter (Ye). The auxiliary electrode (Et) is connected via the conductive wire (W2) to the conductor (Et3) which is located surrounding the cathode side of a hermetically sealed portion (13). The conductor (Et3) which is located surrounding the cathode side of the hermetically sealed portion (13) is implemented by a conductive coil with which the cathode side of the hermetically sealed portion (13) is wound. Since the terminal (F3) of the output of the starter (Ue) and the terminal (F2) of the ground are connected to the two ends of a secondary winding (Se) of a high voltage transformer (Te), during the interval during which the starter (Ue) is not operated, especially during operation after completion of lamp starting, no voltage arises between the terminal (F3) of the output of the starter (Uc) and the terminal (F2) of the ground. An outer lead pin (21A) on the cathode side is connected via a terminal point (Fz) to the terminal (F2) of the ground of the starter (Ue). A state with the same electrical potential is maintained by the arrangement in which the conductor (Et3) which is located surrounding the cathode side of the hermetically sealed portion (13) is connected via the conductive wire (W2), the auxiliary electrode (Et) and the conductive wire (We), during operation in line installation from the outer lead pin (21A) of the cathode side to the terminal (T12) of the ground output of the feed circuit (Bx) at the terminal point (Fz) of the terminal (F2) of the ground of the starter (Ue) and on the conductor (Et3) which is arranged such that it surrounds the cathode side of the hermetically sealed portion (13). In the operating state of the discharge lamp (Ld') the main discharge current of the discharge lamp (Ld') flows in the line path from the tip of a cathode (14) via the outer lead pin (21A) of the cathode side as far as the terminal point (Fz), by which a voltage reduction is formed which is proportional to the product of the resistance value of this line path and the value of the flowing current. The closer the tip of the cathode (14) is approached, the higher the electrical potential becomes.

As was described above, the terminal point (Fz) and the conductor (Et3) have the same electrical potential. The cathode, especially the vicinity of the hermetically sealed portion (13), therefore has a higher electrical potential than the conductor (Et3) which surrounds its periphery. As is described in Japanese patent HEI 4-40828 corresponds to U.S. Pat. No. 4,673,843, as a result in the discharge vessel (11) of the lamp which has reached a high temperature in operation, the metallic cations of the impurities which are contained in the material of the discharge vessel (11) in the vicinity of the hermetically sealed portion (13) thereof are driven in a direction which moves away from the electrode material comprising the cathode. It is furthermore described: Since the phenomenon of detachment of the glass material such as silica glass or the like of the hermetically sealed portion of the discharge vessel from the electrode material as a result of accumulation of metallic cations of impurities on the surface of the electrode material is prevented, the lamp arrangement described above using FIGS. 6(a) and (b) yields the action of preventing the disadvantage of lamp damage which is caused by the above described detachment phenomenon.

However, if an attempt is made to implement the light source device shown in FIG. 7, in which the above described arrangement as shown in FIG. 6 is used for alternating current type of operation (the circuit arrangement in FIG. 7 is essentially identical to FIG. 6 in Japanese patent disclosure document 2002-270386 corresponds to U.S. Pat. No. 6,552,502), for each half period of the AC voltage a polarity inversion of the voltage applied to the discharge lamp (Ld) takes place. In the half period phase in which the above described auxiliary electrode (Et) reaches a cathode-side electrical potential, the disadvantage of lamp damage as a result of the phenomenon of detachment of the glass material such a silica glass or the like of the hermetically sealed portion of the discharge vessel from the above described electrode material is prevented. In the half period phase in which the above described auxiliary electrode (Et) reaches the anode-side electrical potential, this disadvantage is not prevented. Furthermore, in the case of a low alternating driving frequency for application to a discharge lamp (Ld) of for example less than or equal to 3.5 kHz, there is the possibility that in the half period phase in which the above described auxiliary electrode (Et) reaches the cathode-side electrical potential, especially in the hermetically sealed portion of the discharge vessel which in this half period phase represents the cathode side, this disadvantage is exacerbated. This circumstance constituted an unresolved task with respect to implementation of such a light source device.

Compared to the arrangement in which the conductor (Et3) of the auxiliary electrode (Et) of the discharge lamp (Ld') described above using FIGS. 6(a) and (b) actively surrounds the hermetically sealed portion of the discharge vessel, in the discharge lamp (Ld) described in FIG. 7 the hermetically sealed portion of the discharge vessel is not actively surrounded by the auxiliary electrode (Et). When the auxiliary electrode (Et) is located in the vicinity of the hermetically sealed portion of the discharge vessel, it is possible for the above described disadvantage to be exacerbated as before.

SUMMARY OF THE INVENTION

The object of the invention is to devise an operation circuit for a discharge lamp, a device for operating the discharge lamp, and a light source device in which the disadvantage of lamp damage due to the phenomenon of detachment of glass material such as silica glass or the like of the hermetically sealed portion of the discharge vessel from the electrode material in alternating current operation of a discharge lamp is prevented, in which there is an auxiliary electrode besides the electrodes for the main discharge without contact with the discharge space.

According to a first aspect of the invention in an operation circuit (Ub) for a discharge lamp for operating a discharge lamp (Ld) in which there is an auxiliary electrode (Et) in addition to the electrodes (E1, E2) for the main discharge without contact with the discharge space and which comprises the following:

a feed circuit (Ux) for supply of the discharge lamp (Ld);

an inverter (Ui) for polarity inversion of a voltage applied to the discharge lamp (Ld), which is located following the above described feed circuit (Ux);

a trigger circuit (Uz) for supply of a pulsed current to the primary winding (Pz) of a high voltage transformer (Tz) with an autotransformer arrangement for applying a high voltage to the above described auxiliary electrode (Et);

main feed terminals (Tm1, Tm2) for connecting the electrodes (E1, E2) for the main discharge to the above described inverter (Ui); and trigger terminals (Tz1, Tz2) for connection of the above described trigger circuit (Uz) to the above described high voltage transformer (Tz), the above described object is achieved in that the operation circuit is made such that when the trigger circuit (Uz) is not being operated the electrical potential of the trigger terminals (Tz1, Tz2) is maintained essentially at the same electrical potential with respect to the output line (UxG) on the low voltage side of the feed circuit (Ux).

According to one development of the invention for the operation circuit of a discharge lamp this object is achieved in that the frequency of the polarity inversion of the above described inverter (Ui) is less than or equal to 3.5 kHz.

According to another aspect of the invention, in a device for operating the discharge lamp the object is achieved in that the operation circuit (Ub) for the discharge lamp is connected to the above described high voltage transformer (Tz) with a cable.

According to another aspect of the invention, in a light source device the object is achieved in that the device (Up) for operating the discharge lamp is connected to the above described discharge lamp (Ld).

ACTION OF THE INVENTION

The disadvantage of lamp damage as a result of the phenomenon of detachment of the glass material such a silica glass or the like of the hermetically sealed portion of the discharge vessel from the electrode material is prevented by the operation circuit as claimed in the invention for a discharge lamp, the device as claimed in the invention for operating a discharge lamp and the light source device as claimed in the invention even in alternating circuit operation of a discharge lamp, in which there is an auxiliary electrode in addition to the electrodes for the main discharge without contact with the discharge space.

The invention is described below using the accompanying drawings.

BRIEF DESCRIPTION OF THE DRAWINGS

FIG. 5 shows a schematic of another embodiment of the operation circuit for a discharge lamp, a device for operation of a discharge lamp and a light source device of the invention in a simplified representation;

FIG. 6(a) shows a schematic of a lamp with conductors which surround the cathode side of the hermetically sealed portion in a conventional light source device of the direct current operation type, in an outside view;

FIG. 6(b) shows a schematic of a lamp with conductors which surround the cathode side of the hermetically sealed portion in a conventional light source device of the direct current operation type in a partial cross section.

DETAILED DESCRIPTION OF THE INVENTION

Figure 1:
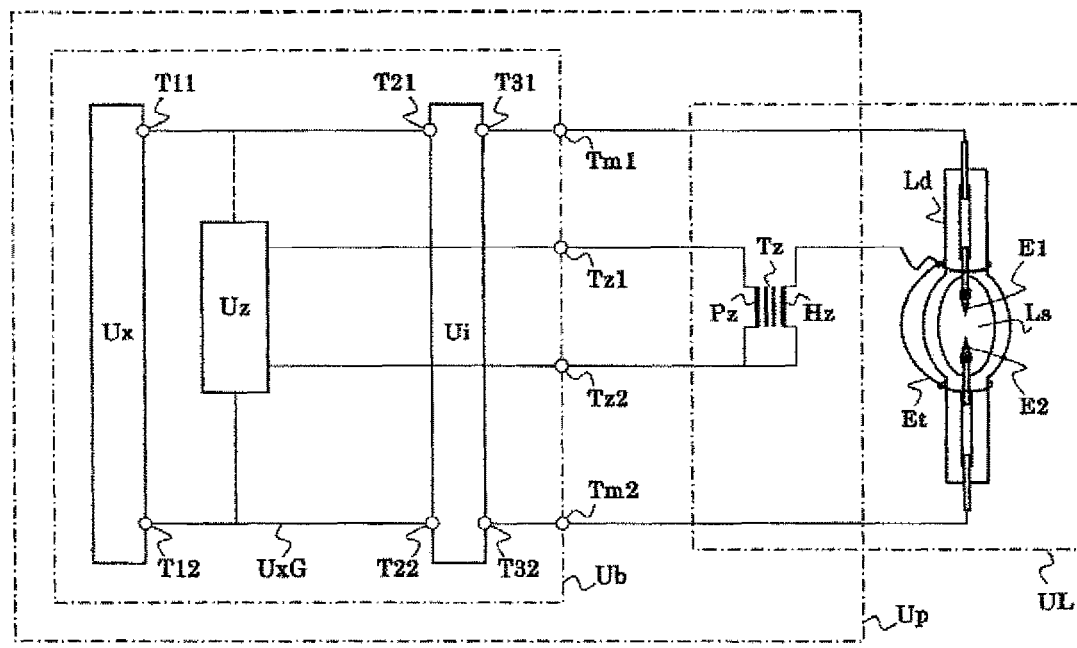
FIG. 1 shows a block diagram which shows an operation circuit for a discharge lamp, a device for operation of a discharge lamp and a light source device of the invention in a simplified representation.

First, one version of the invention is described using FIG. 1 as a block diagram in which one configuration of an operation circuit as claimed in the invention for a discharge lamp is shown simplified. The feed circuit (Ux) which consists of a voltage reduction chopper circuit or the like according to the state of the discharge lamp (Ld) or the operation sequence outputs a suitable voltage and a suitable current. The inverter (Ui) of a fill bridge circuit or the like converts the voltage output by the feed device (Ux) into an AC voltage which has for example been periodically inverted, the latter is output and applied to a pair of electrodes (E1, E2) for the main discharge of the discharge lamp (Ld) which are connected via the main feed terminals (Tm1, Tm2).

The high voltage transformer (Tz) has a so-called autotransformer arrangement in which a primary winding (Pz) and a secondary winding (Hz) are connected inside or outside of the high voltage transformer (Tz). It produces a high voltage which is increased according to the winding ratio of the secondary winding to the primary winding and according to the voltage applied to the primary winding, in the secondary winding (Hz) and it can be applied to the auxiliary electrode (Et) of the discharge lamp (Ld) which is connected to one of the terminals of the secondary winding (Hz).

The trigger circuit (Uz) is electrically connected to the output line (UxG) on the low voltage side of the feed circuit (Ux). During operation of the trigger circuit (Uz), by a connection to the primary winding (Pz) of the high voltage transformer (Tz) via the trigger terminals (Tz1, Tz2), a voltage can be applied to the primary winding and thus a pulse current is allowed to flow. When the trigger circuit (Uz) is not being operated however the electrical potential of the trigger terminals (Tz1, Tz2) with respect to the output line (UxG) on the low voltage side of the feed circuit (Ux) in practice is kept at the same electrical potential.

In FIG. 1, as is shown for example using the broken line, the feed source on the high voltage side with respect to the trigger circuit (Uz) need not be limited to the output of the feed circuit (Ux). For example, feeding can also be received from a DC current source (Mx) upstream of the feed circuit (Ux) described below.

In FIG. 1, a node in which the primary winding (Pz) of the high voltage transformer (Tz) is connected to the secondary winding (Hz) is connected to the trigger terminal (Tz2). But it can be equally well connected to the trigger terminal (Tz1). Considering the waveforms and polarities of the high voltage pulse which is applied to the auxiliary electrode (Et) during operation of the high voltage transformer (Tz), a more favorable arrangement of the two arrangements can be selected. Normally it is advantageous to select the one for which the absolute value of the peak value of the voltage waveform of the high voltage pulse applied to the auxiliary electrode (Et) is greater.

By this arrangement of the operation circuit for a discharge lamp, regardless of the phase of the inverter (Ui) in the output line UxG) on the low voltage side of the feed circuit (Ux) therefore the electrical potential of the auxiliary electrode (Et) is kept in practice at the same electrical potential, by which the interval during which there is an electrical potential on the anode side is no longer present. Therefore the disadvantage of lamp damage as a result of the phenomenon of detachment of the glass material such as silica glass or the like of the hermetically sealed portion of the discharge vessel from the above described electrode material can be avoided.

In the case of sodium ions which are typical metallic cations of impurities which are contained in the glass material such as silica glass or the like of the hermetically sealed portion of the discharge vessel of the discharge lamp (Ld), the degree of ion mobility at the typical temperature of the hermetically sealed portion of the discharge vessel in rated operation of 1000° C., i.e. the ion mobility velocity per unit field strength, is estimated at roughly $7 \times 10^{-6}$ cm$^2$/Vs (G. Greeuw, J. F. Verwey "The mobility of Na$^+$, Li$^+$ and K$^+$ ions in thermally grown SiO$_2$ films", J. Appl. Phys. Vol. 56, No. 8, 15 Oct. 1984, page 2218-2224).

Figure 7:
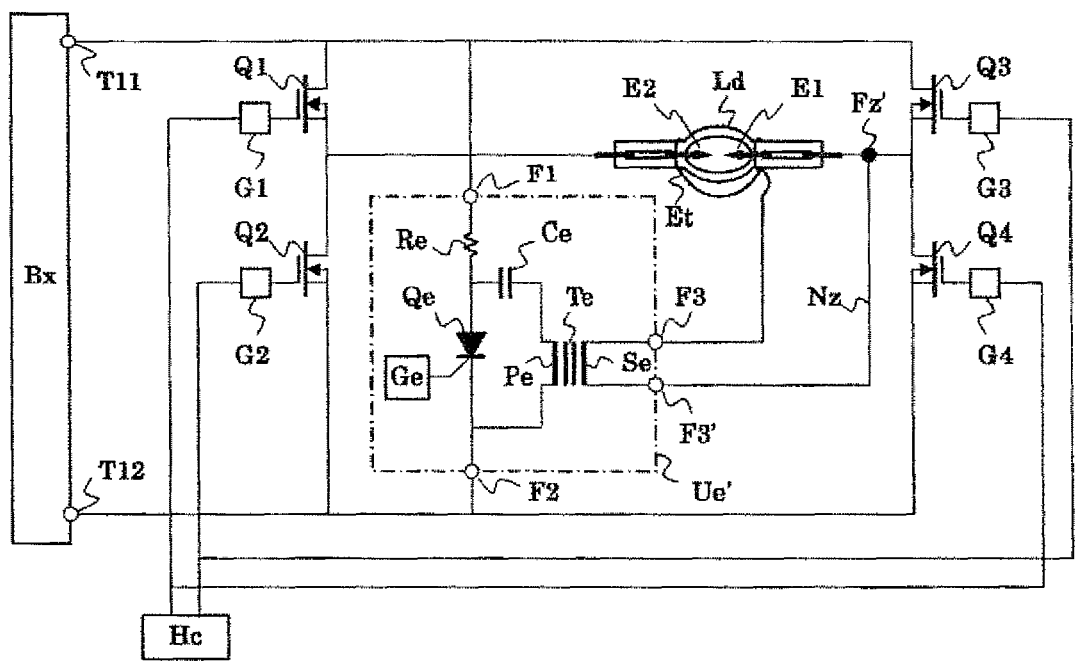
FIG. 7 shows a schematic of a simplified arrangement of a conventional light source device of the alternating current operation type.

If the arrangement shown in FIG. 7 is considered, under the assumption of an ion travel distance of 100 Angstroms according to very strong ion accumulation through one half period phase, in which the auxiliary electrode (Et) reaches the electrical potential on the anode side, in the hermetically sealed portion of the discharge vessel which constitutes the cathode side during this interval, the disadvantage of lamp damage as a result of the phenomenon of detachment of a glass material such as silica glass or the like of the hermetically sealed portion of the discharge vessel from the above described electrode material can be caused, the length of the corresponding time interval during which the auxiliary electrode (Et) represents the electrical potential on the anode side is computed at roughly 0.14 ms, because the voltage of the electrical potential on the anode side, i.e. the typical lamp voltage, is 100 V and the typical thickness of the glass material of the hermetically sealed portion of the discharge vessel is 1 mm.

If for the reciprocal number which is twice as great as this length of the time interval, the frequency of the polarity inversion of the inverter (Ui) is less than or equal to 3.5 kHz, it is therefore possible for the disadvantage of lamp damage as a result of the phenomenon of detachment of a glass material such as silica glass or the like of the hermetically sealed portion of the discharge vessel from the above described electrode material to occur in the arrangement described in FIG. 7.

It therefore becomes apparent that the operation circuit described in FIG. 1 is even more advantageous for a discharge lamp in the case of a frequency of polarity inversion of the inverter (Ui) of less than or equal to roughly 3.5 kHz.

For the operation circuit (Ub) arranged in the above described manner for a discharge lamp, the arrangement of the circuit (Nz) described in FIG. 7 which connects the terminal (F3') of the secondary winding (Se) of the high voltage transformer to the terminal point (Fz') on the line for turning on the electrodes for the main discharge of the discharge lamp (Ld) becomes unnecessary. Since line installation following the high voltage transformer (Tz) is simplified, his operation circuit (Ub) is normally well suited for an arrangement of a device (Up) for operating a discharge lamp by separating the high voltage transformer (Tz) from the operation circuit (Ub) for a discharge lamp which consists of a printed circuit board, and by a connection thereof using a cable. By this arrangement, as was described above, the advantages of a reduction in the size and weight of the device for operating the discharge lamps reducing the noise, increasing the reliability, cutting costs and similar advantages can be enjoyed.

In a device (Up) for operating a discharge lamp which is arranged using the operation circuit (Ub) arranged in the above described manner for a discharge lamp, due to simple line installation following the high voltage transformer (Tz) an arrangement without using a very heat-resistant printed circuit board which means high costs is enabled. Thus an arrangement in the vicinity of the discharge lamp (Ld) which is slightly overheated by the radiant heat is enabled. In the arrangement of the light source device therefore the discharge lamp (Ld) and the high voltage transformer (Tz) can be formed as a one-piece unit (UL).

Versions of the invention are described below using several embodiments which are shown in the drawings and which have more specific arrangements.

Figure 2:
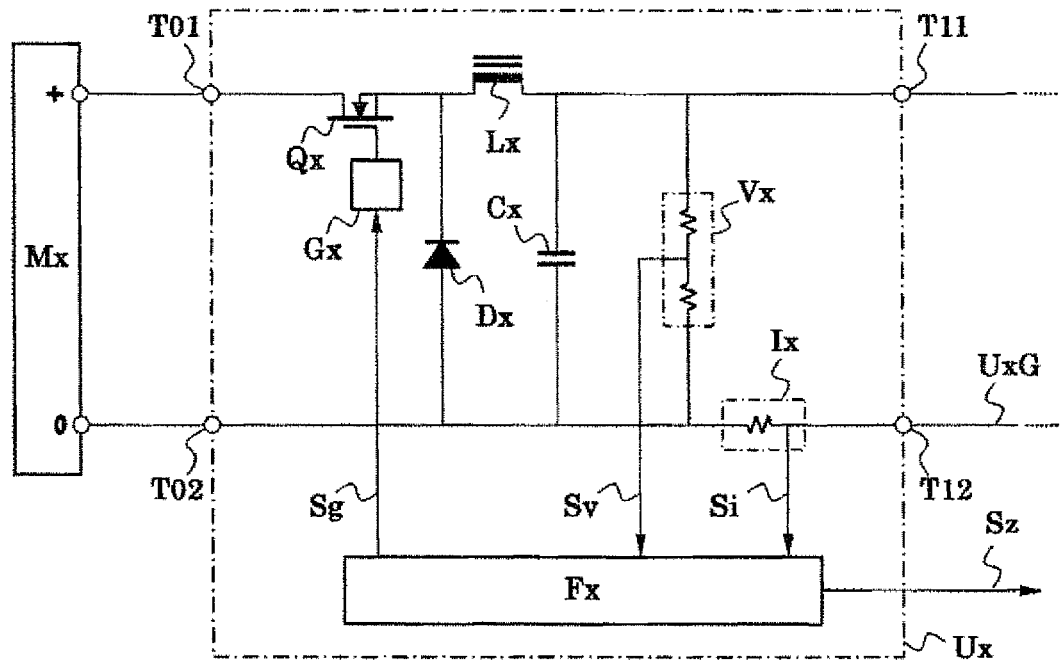
FIG. 2 shows a schematic of one embodiment of the operation circuit for a discharge lamp, a device for operation of a discharge lamp, and a light source device of the invention in a simplified partial view.

FIG. 2 shows the feed circuit (Ux) which is described in FIG. 1 and in the above described embodiment In this connection a simplified example of an arrangement of a voltage reduction chopper circuit is shown. The feed circuit (Ux) in which the voltage reduction chopper circuit constitutes its main part, receives a supply of voltage from a DC current source (Mx) such as a PFC (power factor corrector) or the like and is operated in this way. For this reason, the feed amount for the discharge lamp (Ld) is controlled. For the feed circuit (Ux) the current from the DC current source (Mx) is turned on and off by a switching device (Qx) such as a FET or the like, a smoothing capacitor (Cx) is charged via a reactor (Lx) and this voltage is applied to the discharge lamp (Ld), by which the current in the discharge lamp (Ld) can flow.

During the interval during which the switching device (Qx) is in the ON state, the smoothing capacitor (Cx) is directly charged by the current which is passing through the switching device (Qx), the discharge lamp (Ld) as a load is supplied with current and furthermore energy is stored in the form of a flux in the reactor (Lx). During the interval during which the switching device (Qx) is in the OFF state, the smoothing capacitor (Cx) is charged by the energy stored in the reactor (Lx) in the form of a flux via a flywheel diode (Dx) and current is supplied to the discharge lamp (Ld).

For a feed circuit (Ux) of the voltage reduction chopper type, the feed amount for the discharge lamp can be adjusted by the ratio of the length of the ON state of the switching device (Qx) to the operating period of the switching device (Qx), i.e. by the duty factor. In this connection, because a gate driver signal (Sg) with a certain duty factor is produced by a feed control circuit (Fx) and the gate terminal of the switching device (Qx) is controlled via a gate driver circuit (Gx), turning the current from the DC power source on and off is controlled.

The lamp current which flows between the electrodes (E1, E2) of the discharge lamp (Ld), and the lamp voltage forming between the electrodes (E1, E2) can be determined by a lamp current detection means (Ix) and a lamp voltage detection means (Vx). The lamp current detection means (Ix) can be easily built using a shunt resistor and the voltage current detection means (Vx) using a voltage divider resistor.

The lamp current detection signal (Si) from the lamp current detection means (Ix) and the lamp voltage detection signal (Sx) from the lamp voltage detection means (Vx) are input into the feed control circuit (Fx). When the lamp starts, the feed control circuit (Fx) typically outputs a voltage of roughly 300 V, which is called the no-load voltage. Immediately after starting of the lamp, the voltage of the discharge lamp (Ld) is low, and the rated wattage cannot be supplied. It therefore outputs a constant current called the initial limit current. After the voltage of the discharge lamp (Ld) has increased according to the temperature increase, and the rated wattage has been supplied, as well as in rated operation, depending on the voltage of the discharge lamp (Ld) it produces the gate driver circuit (Sg) feeding back in such a manner that the current is output with the value at which the wattage consumed by the discharge lamp (Ld) constitutes the rated wattage.

Figure 3:
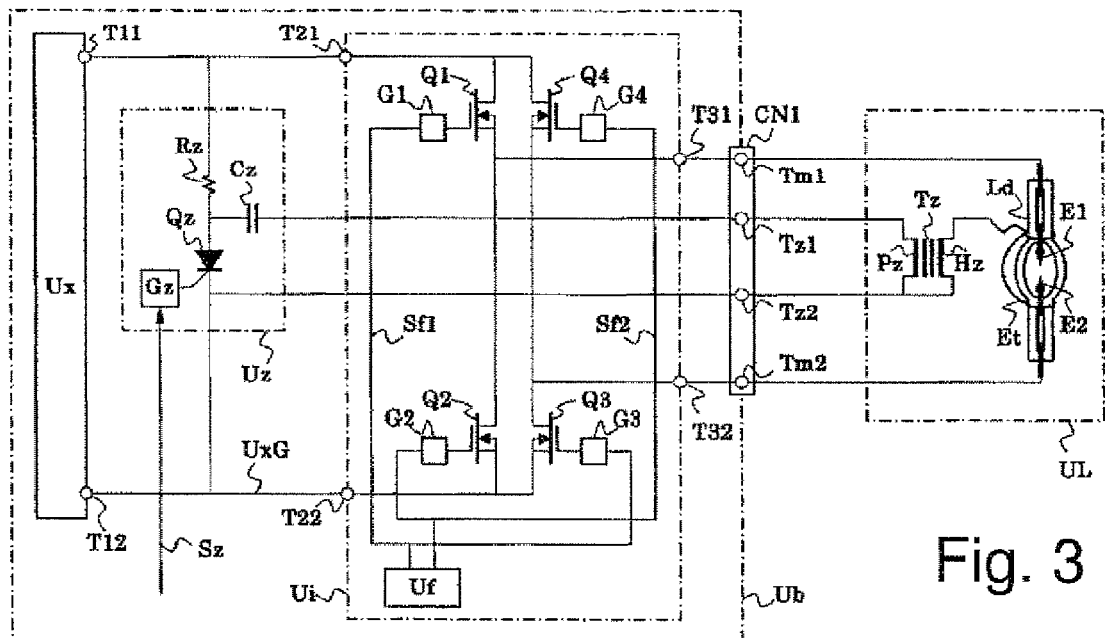
FIG. 3 shows a schematic of one embodiment of the operation circuit for a discharge lamp, a device for operation of a discharge lamp and a light source device of the invention in a simplified representation.

FIG. 3 shows one configuration of the operation circuit of a discharge lamp as claimed in the invention in a simplified representation, the block diagram as shown in FIG. 1 being shown specifically. The inverter (Ui) consists of a full bridge circuit using switching devices (Q1, Q2, Q3, Q4) such as FETs or the like which are each driven by the respective gate driver circuits (G1, G2, G3, G4) which are controlled by the inverter control signals (Sf1, Sf2) which are produced by the inverter control circuit (Uf), such that the switching devices (Q1, Q3) and the switching devices (Q2, Q4) which form diagonal elements to one another are closed at the same time.

If when starting the lamp a no-load voltage is supplied by the feed circuit (Ux), a capacitor (Cz) is charged relatively slowly via a resistor (Rz) in the trigger circuit (Uz) and via the primary winding (Pz) of the high voltage transformer (Tz). When the gate driver circuit (Gz) is operated by the trigger signal (Sz) of the feed control circuit (Fx) and when the switching device (Qz) passes quickly into the closed state using a SCR or the like, the capacitor (Cz) is quickly discharged via the switching device (Qz) and via the primary winding (Pz) of the high voltage transformer (Tz), by which a pulse current flows in the primary winding (Pz) of the high voltage transformer (Tz). By this operation a high voltage forms on the secondary winding (Hz) of the high voltage transformer (Tz), as was described above. This high voltage is applied to the auxiliary electrode (Et) of the discharge lamp (Ld), by which the discharge lamp (Ld) is started.

After the discharge lamp (Ld) is started and the trigger circuit (Uz) has stopped its operation, the auxiliary electrode (Et) has the same electrical potential as the trigger terminal (Tz2), since a voltage does not form in the secondary winding (Hz) of the high voltage transformer (Tz). Since the trigger terminal (Tz2) is connected to the output line (UxG) on the low voltage side of the feed circuit (Ux), the electrical potential of the auxiliary electrode (Et) regardless of the phase of the inverter (Ui) in practice is kept at the same electrical potential as the electrical potential of the output line (UxG) on the low voltage side of the feed circuit (Ux). For this reason the interval during which the electrical potential is present on the anode side no longer exists, by which the disadvantage of lamp damage as a result of the phenomenon of detachment of the glass material such as silica glass or the like of the hermetically sealed portion of the discharge vessel from the above described electrode material can be avoided.

Figure 4:
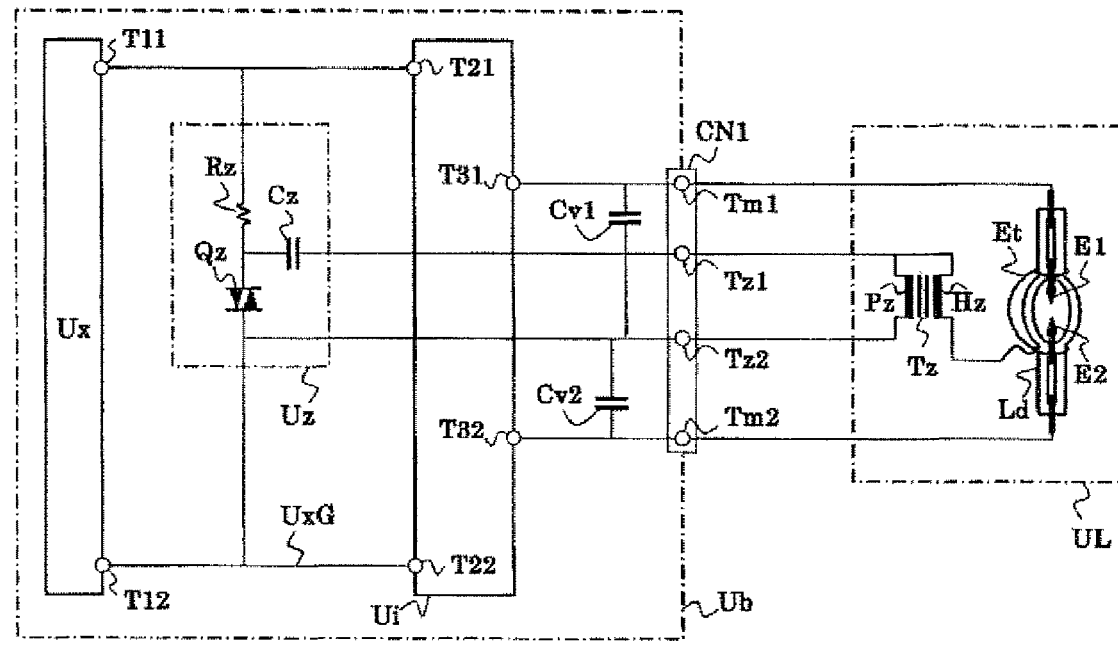
FIG. 4 shows a schematic of another embodiment of the operation circuit for a discharge lamp, a device for operation of a discharge lamp, and a light source device of the invention in a simplified representation.

FIG. 4 shows another configuration of an operation circuit as claimed in the invention for a discharge lamp in a simplified representation. In the circuit shown in FIG. 4, a passive element such as a SIDAC or the like is used for the switching device (Qz). The control signal as shown in FIG. 3 which corresponds to the trigger signal (Sz) is therefore unnecessary. When charging of the capacitor (Cz) continues and when the voltage applied to the switching device (Qz) reaches a threshold value voltage which is typical for the switching device (Qz), the switching device (Qz) passes quickly into a conductive state. As in the case as shown in FIG. 3, in the secondary winding (Hz) of the high voltage transformer (Tz) a high voltage forms which is applied to the auxiliary electrode (Et) of the discharge lamp (Ld).

In an operation circuit for a discharge lamp as shown in FIG. 3, the low voltage side of the secondary winding (Hz) of the high voltage transformer (Tz) is connected to the trigger terminal (Tz2). In the operation circuit for a discharge lamp as shown in FIG. 4, the low voltage side of the secondary winding (Hz) of the high voltage transformer (Tz) is however connected to the trigger terminals (Tz1). In this case, for the primary winding (Pz) and for the secondary winding (Hz) of the high voltage transformer (Tz) a voltage does not form either after the trigger circuit (Uz) has stopped its operation. Therefore the electrical potential of the auxiliary electrode (Et) reaches the same electrical potential as that of the trigger terminal (Tz2) by the secondary winding (Hz) and the primary winding (Pz). Since the trigger terminal (Tz2) is connected to the output line (UxG) on the low voltage side of the feed circuit (Ux), the electrical potential of the auxiliary electrode (Et) in practice is kept at the same electrical potential as the electrical potential of the output line (UxG) on the low voltage side of the feed circuit (Ux), regardless of the phase of the inverter (Ui). For this reason the interval during which the electrical potential is present on the anode side no longer exists. Therefore the disadvantage of lamp damage as a result of the phenomenon of detachment of the glass material such as silica glass or the like of the hermetically sealed portion of the discharge vessel from the above described electrode material can be avoided.

In the operation circuit for a discharge lamp as shown in FIG. 4, there are capacitors (Cv1, Cv2) which are used to protect against the danger that by applying a high voltage to the auxiliary electrode (Et) during operation of the high voltage transformer (Tz) and by achieving electrical conductivity of the discharge space (Ls) by the formation of a dielectric barrier discharge in the discharge space (Ls), the electrodes (E1, E2) are exposed to the high voltage and the danger that this voltage will destroy the switching devices (Q1, Q2, Q3, Q4) of the inverter (Ui). As a specific example of the value of the electrostatic capacity of the capacitors (Cv1, Cv2), it is advantageous to fix the value for which the current flowing when the polarity of the inverter (Ui) is inverted does not become unduly large, and for which the above described action of protection against danger can be developed, at a few dozen picofarads to a few hundred picofarads.

But if one of the switching devices (Q1, Q3) as diagonal elements and one of the switching devices (Q2, Q4) as diagonal elements are in the conductive state, these switching devices (Q1, Q2, Q3, Q4) are never destroyed. Even in the case in which both of the switching devices (Q1, Q3) or both of the switching devices (Q2, Q4) as diagonal elements are not in the conductive state, the arrangement of the capacitors (Cv1, Cv2) is normally unnecessary, since the electrostatic capacity of the switching devices (Q1, Q2, Q3, Q4) is present (when these switching devices are FETs, it is the electrostatic capacity between the source and drain).

FIG. 5 shows another configuration of the operation circuit as claimed in the invention for a discharge lamp in a simplified representation. A transformer (Th) for amplifying the no-load voltage which is applied to the electrodes (Et, E2) for the main discharge when the high voltage transformer (Tz) is being operated has been added to this operation circuit for a discharge lamp, in contrast to FIG. 3, FIG. 4 and the like. Thus, an improvement concept for the operating property of the discharge lamp (Ld) has been implemented.

In this connection, a capacitor (Ch) which together with the capacitor (Cz) is connected to a terminal node between the resistor (Rz) and the switching device (Qz) was added to the trigger circuit (Uz). Via the primary winding (Ph) of the transformer (Th) the capacitor (Ch) is charged. When a pulse current is flowing in the primary winding (Pz) of the high voltage transformer (Tz) and when a high voltage pulse is applied to the auxiliary electrode (Et), likewise a pulse current flows in the primary winding (Ph) of the transformer (Th), by which in the secondary winding (Sh) a voltage forms which is superimposed on the no-load voltage which is applied by the feed circuit (Ux) to the electrodes (E1, E2).

As a result, the operating property of the discharge lamp (Ld) is improved. With respect to the transformer (Th) the inductance values and the winding directions of the primary winding (Ph) and the secondary winding (Sh) can be fixed such that the waveform of the voltage forming in the secondary winding (Sh) compared to the high voltage pulse which is applied to the auxiliary electrode (Et) has suitable timing and suitable polarity.

Since the transformer (Th) is located downstream from the inverter (Ui), it can happen that by superposition of the voltage produced in the secondary winding (Sh) of the transformer (Th) the absolute value of the voltage applied to the electrodes (Et, E2) becomes conversely low, when the phase of the polarity inversion of the inverter (Ui) and the operation timing of the transformer (Th) are not controlled. Therefore the trigger signal (Sz) can be synchronized to the phase of polarity inversion of the inverter (Ui) such that the transformer (Th) is operated with timing with which the absolute value of the voltage applied to the electrodes (E1, E2) is increased. Or the operation of polarity inversion of the inverter (Ui) during starting is kept under the condition which is adapted to the polarity of the voltage which the secondary winding (Sh) of the transformer (Th) produces.

In these application documents, only what is most critical in the circuit arrangement has been described in order to explain the operation, the function and the action of the operation circuit as claimed in the invention for a discharge lamp and the device as claimed in the invention for operating a discharge lamp. It is therefore assumed that the other details of the described circuit arrangement and of the described circuit operation, for example the polarity of the signals, the specific selection, the specific addition and omission of the circuit elements or concepts such as changes and the like based on facilitating the procurement of components and for economic reasons are carried out in the construction of the actual device.

It is assumed that especially a device for protecting circuit elements such as FETs or the like against damage factors, such as a wattage exceeding a certain value, a current exceeding a certain value, overheating and the like, or a device which reduces formation of radiation interference and line noise which form according to the operation of the circuit elements of the feed device or which prevents the noise which has formed from penetrating to the outside, such as for example a snubber circuit, a varistor, a clamp diode (including the "pulse-by-pulse" method) a current limiter circuit, a noise filter reactor, with a "common mode" or "normal mode", a noise filter capacitor and the like, if necessary is added to the respective part of the circuit arrangements described in the embodiments.

What is claimed is:

1. Operating circuit for operating a discharge lamp in which, in addition to main discharge electrodes, there is an auxiliary electrode without contact with a discharge space of the lamp, comprising the following components:
   a feed circuit for supplying voltage to the discharge lamp;
   an inverter for inverting the polarity of the voltage supplied to the discharge lamp, the inverter following the feed circuit;
   a trigger circuit for supplying a pulsed current to a primary winding of a high voltage transformer with an autotransformer arrangement for applying a high voltage to the auxiliary electrode;
   main feed terminals for connecting the main discharge electrodes to the inverter; and trigger terminals for connection of the trigger circuit to the high voltage transformer, wherein said components are arranged in the operating circuit such that the electrical potential of the trigger terminals is maintained essentially at the same electrical potential as an output line on a low voltage side of the feed circuit when the trigger circuit is inoperative.

2. Operating circuit for a discharge lamp in accordance with claim 1, wherein the feed circuit is adapted for supplying a DC current and wherein the inverter is arranged for converting the supplied DC voltage into an AC voltage.

3. Operating circuit for a discharge lamp in accordance with claim 1, wherein the trigger circuit is electrically connected to the output line on the low voltage side of the feed circuit.

4. Operating circuit for a discharge lamp in accordance with claim 3, wherein a node in which the primary winding of the high voltage transformer is connected to a secondary winding of the high voltage transformer is connected to one of the trigger terminals.

5. Operating circuit for a discharge lamp in accordance with claim 1, wherein the inverter has a frequency of polarity inversion that is at most 3.5 kHz.

6. Operating circuit for a discharge lamp in accordance with claim 4, wherein the inverter has a frequency of polarity inversion that is at most 3.5 kHz.

7. Operating device for operating a discharge lamp, an operating circuit having the following components:

a feed circuit for supplying voltage to the discharge lamp;

an inverter for inverting the polarity of the voltage supplied to the discharge lamp, the inverter following the feed circuit;

a trigger circuit for supplying a pulsed current to a primary winding of a high voltage transformer with an autotransformer arrangement for applying a high voltage to an auxiliary electrode;

main feed terminals for connecting main discharge electrodes of the discharge lamp to the inverter; and trigger terminals for connection of the trigger circuit to the high voltage transformer, a cable connecting the operating circuit to the high voltage transformer;

wherein the components of the operating circuit are arranged in the operating circuit such that the electrical potential of the trigger terminals is maintained essentially at the same electrical potential as an output line on a low voltage side of the feed circuit when the trigger circuit is inoperative.

8. Operating device in accordance with claim 7, wherein the feed circuit is adapted for supplying a DC current and wherein the inverter is arranged for converting the supplied DC voltage into an AC voltage.

9. Operating device in accordance with claim 7, wherein the trigger circuit is electrically connected to the output line on the low voltage side of the feed circuit.

10. Operating device in accordance with claim 9, wherein a node in which the primary winding of the high voltage transformer is connected to a secondary winding of the high voltage transformer is connected to one of the trigger terminals.

11. Operating device in accordance with claim 7, wherein the inverter has a frequency of polarity inversion that is at most 3.5 kHz.

12. Operating device in accordance with claim 10, wherein the inverter has a frequency of polarity inversion that is at most 3.5 kHz.

13. Light source device, comprising:

a discharge lamp having a lamp vessel, an external auxiliary electrode on the lamp vessel and main discharge electrodes in a discharge space of the lamp vessel;

an operating circuit having the following components:

a feed circuit for supplying voltage to the discharge lamp;

an inverter for inverting the polarity of the voltage supplied to the discharge lamp, the inverter following the feed circuit;

a trigger circuit for supplying a pulsed current to a primary winding of a high voltage transformer with an autotransformer arrangement for applying a high voltage to an auxiliary electrode;

main feed terminals for connecting main discharge electrodes of the discharge lamp to the inverter; and trigger terminals for connection of the trigger circuit to the high voltage transformer, a cable connecting the operating circuit to the high voltage transformer;

wherein the components of the operating circuit are arranged in the operating circuit such that the electrical potential of the trigger terminals is maintained essentially at the same electrical potential as an output line on a low voltage side of the feed circuit when the trigger circuit is inoperative.

14. Light source device in accordance with claim 13, wherein the feed circuit is adapted for supplying a DC current and wherein the inverter is arranged for converting the supplied DC voltage into an AC voltage.

15. Light source device in accordance with claim 13, wherein the trigger circuit is electrically connected to the output line on the low voltage side of the feed circuit.

16. Light source device in accordance with claim 15, wherein a node in which the primary winding of the high voltage transformer is connected to a secondary winding of the high voltage transformer is connected to one of the trigger terminals.

17. Light source device in accordance with claim 13, wherein the inverter has a frequency of polarity inversion that is at most 3.5 kHz.

18. Light source device in accordance with claim 16, wherein the inverter has a frequency of polarity inversion that is at most 3.5 kHz.

* * * * *